United States Patent
Son et al.

(10) Patent No.: US 6,211,977 B1
(45) Date of Patent: Apr. 3, 2001

(54) METHOD OF PRODUCING A HOLOGRAPHIC PROJECTION SCREEN FOR DISPLAYING A THREE-DIMENSIONAL COLOR IMAGES

(75) Inventors: Jung Young Son, Kyung-Ki Do (KR); Vladimir I. Bobrinev, Moscow (RU)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/432,410

(22) Filed: Nov. 2, 1999

Related U.S. Application Data

(63) Continuation-in-part of application No. 08/897,052, filed on Jul. 18, 1997, now abandoned.

(30) Foreign Application Priority Data

Jul. 18, 1996 (KR) .................................................. 96-28966

(51) Int. Cl.[7] .............................. G02B 5/32; G03H 1/02
(52) U.S. Cl. .................................................. 359/28; 359/15
(58) Field of Search ................................... 359/1, 15, 22, 359/30, 28

(56) References Cited

U.S. PATENT DOCUMENTS

| 4,427,265 | * | 1/1984 | Suzuki et al. | 359/599 |
| 4,799,739 | * | 1/1989 | Newswanger | 359/12 |
| 5,046,793 | * | 9/1991 | Hockley et al. | 359/12 |

FOREIGN PATENT DOCUMENTS

WO 93/02372 * 2/1993 (GB) .............. G02B/5/32

OTHER PUBLICATIONS

Hillaire et al., Real–time Holographic Display, Practical Holography, pp. 254–261, Feb. 1991.*

* cited by examiner

*Primary Examiner*—Thong Nguyen
*Assistant Examiner*—Jared Treas
(74) *Attorney, Agent, or Firm*—Oblon, Spivak, McClelland, Maier & Neustadt, P.C.

(57) ABSTRACT

A method of producing a holographic screen for projection of the three-dimensional color images is proposed, where a narrow and elongate slit-shaped diffuser is recorded on the hologram as an object to ensure the well-defined viewing zone forming in the course of the image projection. As compared with the previous art the diverging reference beam is used for the screen recording, therefore only small size optical elements are used in the recording setup. When screen is illuminated by the projector, the reconstructed real images of the diffuser are formed behind the screen for each color of the projector light spectrum. A viewing zone, wherefrom a full color image can be seen as projected on the screen, is obtained by making the length of the diffuser big enough to provide overlaps of the various color diffuser images of the projector light, diffracted on the screen. The parameters required for the recording of the holographic screen, including the position of a photoplate with respect to the diffuser, the distance from which an image is observed, the position of a reference wave point source with respect to the diffuser, and so on, are determined by consideration of the phase relationships between the reference, object, projector and reconstructed waves on the photographic plate surface.

4 Claims, 5 Drawing Sheets

METHOD OF PRODUCING A HOLOGRAPHIC PROJECTION SCREEN FOR DISPLAYING A THREE-DIMENSIONAL COLOR IMAGES

This is a Continuation-in-part of the U.S. application Ser. No. 08/897,052, filed on Jul. 18, 1997, now abandoned.

BACKGROUND OF THE INVENTION

1. Field of Invention

The invention relates generally to an application technique using holography, and more particularly, to a method of producing a projection holographic screen for displaying a three-dimensional color images.

2. Description of the Related Art

A projection holographic screen is a kind of holographic optical element that serves as a general image display screen where an image, being projected on the screen, can be observed if an eye is disposed within a limited viewing zone. In order to observe a stereoscopic or multiview image, the viewing zones should be narrow enough to deliver to the left and right eyes of the viewer the left and right images correspondingly. For projection of the stereoscopic image the viewing zone centers should be spaced apart from each other by an eye-to-eye distance (about 6.5 cm).

There are two types of the projection holographic screens known in the art, i.e., a reflection type and a transmission type. The holographic screen of the reflection type selectively displays only an image projected through a projector on the screen, while serving as a reflection mirror having a focusing capacity which allows an image of the exit pupil of a projection lens to be focused to form the viewing zone. However, as this type of holographic screen has a high angular and spectral selectivity, only a monochromatic image with a limited viewing zone can be displayed on the screen. Further, three holographic screens of the reflection type formed by red, blue and green lasers should be stacked to display a color image.

The transmission type holographic screen is formed as a hologram of the diffusive light scatterer. When the screen is illuminated by the projected image the light scattered by the screen surface is directed to the predefined domain or viewing zone. The properly produced holographic screen as seen from the viewing zone should have the uniform illumination of all its surface and true color reproduction. These peculiarities depend of the screen recording method.

In the conventional setup for the holographic screen recording as disclosed, for example, in U.S. Pat. No. 4,799,739 and PCT International Publication WO 93/02372, a converging reference wave is made to interfere on a holographic photoplate with an object wave incident upon the photoplate via a diffuser. Being illuminated by the projector, the holographic screen is forming the real image of the diffuser in front of the screen, the viewing zone coincides with this image. The most serious drawback of the described setup is the necessity to use big size optics for the screen recording: at least one lens should be bigger than the screen itself.

SUMMARY OF THE INVENTION

It is therefore an object of the present invention to provide a method of producing a holographic screen for displaying a stereoscopic or multiview color image without big size optical elements in the screen recording setup, which is optimized by mathematically analyzing the image reproduction process via the produced holographic screen. For the optimized holographic screen recording, an elongate and narrow diffusing slit is used as an object and the diffuser position relative to the photoplate is mathematically set to make the light, being diffracted into viewing zone, to possess all spectral components within a visible range. The diffuser should be in the form of the narrow slit to provide the sharp separation of the viewing zones for the left and right eyes, the slit should be inclined to the photoplate surface to provide appropriate focusing of all spectral component in the viewing zone, and the lengths of the slit should be big enough to provide overlapping in the viewing zone all spectral components of the visible spectrum. If these conditions are satisfied, the viewer can see a 3D color image, projected on the screen.

A method of producing a holographic screen for displaying a stereoscopic or multi-view color image in accordance with the present invention comprises the steps of placing a photoplate on the x-y plane of a three-dimensional space, center of the photoplate being disposed in the origin of a three-dimensional space; forming a point light source from the laser beam for radiating a reference beam at position on the z-axis spaced apart by the distance $R_1$ from the origin of a three-dimensional space; and placing a elongated narrow slit diffuser illuminated by the same laser as used for forming the reference beam in front of the photoplate; $R_2$ is a distance between the origin of the three-dimensional space and a point of the diffuser, $\alpha$ is the angle between the positive z-axis and a straight line connecting the origin to the same point of the diffuser. The reference wave is interfering on the photoplate with an object wave from diffuser, wherein the diffuser is placed such that the distance $R_2$ and angle $\alpha$ satisfy the following equations:

$$k_2 r_3 + k_1(r_1 - r_2) = -k_2 r_4 + \text{const} \tag{1}$$

$$\alpha = \sin^{-1}\left[\frac{k_2}{k_1}\sin\beta\right] = \sin^{-1}\left[\frac{\lambda_1}{\lambda_2}\sin\beta\right] \tag{2}$$

$$R_2 = \frac{R_1}{1 + \frac{2\lambda_1 R_1}{\lambda_2 R_4}} \tag{3}$$

where $r_1$ is the distance between an arbitrary point (x,y) on the photoplate and the point source of the reference beam; $r_2$ is the distance between the point (x,y) and the point on the diffuser; $R_3$ is the distance between the origin and the exit pupil of the projector; $r_3$ is the distance between the point (x,y) and the exit pupil; $r_4$ is the distance between the origin and the center of the viewing zone; $\beta$ is the angle between the negative z-axis and the straight line connecting the origin to the center of the viewing zone; $\lambda_1$ and $\lambda_2$ represent wavelengths of the recording and projecting waves, respectively; and $k_1$ and $k_2$ are wave numbers of the recording and projecting waves, respectively.

Preferably the diffuser is a narrow and elongate slit-shaped ground glass as derived from equations (2) and (3); the reference wave is diverging from the point distant by $R_1$ from photoplate.

An additional advantage of the presented screen is the possibility to use all wavelengths of the visible spectrum for the image projection contrary to the reflection type screen, which can use only selected wavelengths.

Furthermore, a reflection mirror can be attached to the holographic screen so that the combination of the holographic screen and the mirror can be used as a reflection-type holographic screen and small angular displacements of the screen, together with the mirror can be used to make the viewing zone follow the viewer's eye movements.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

Figure 1:
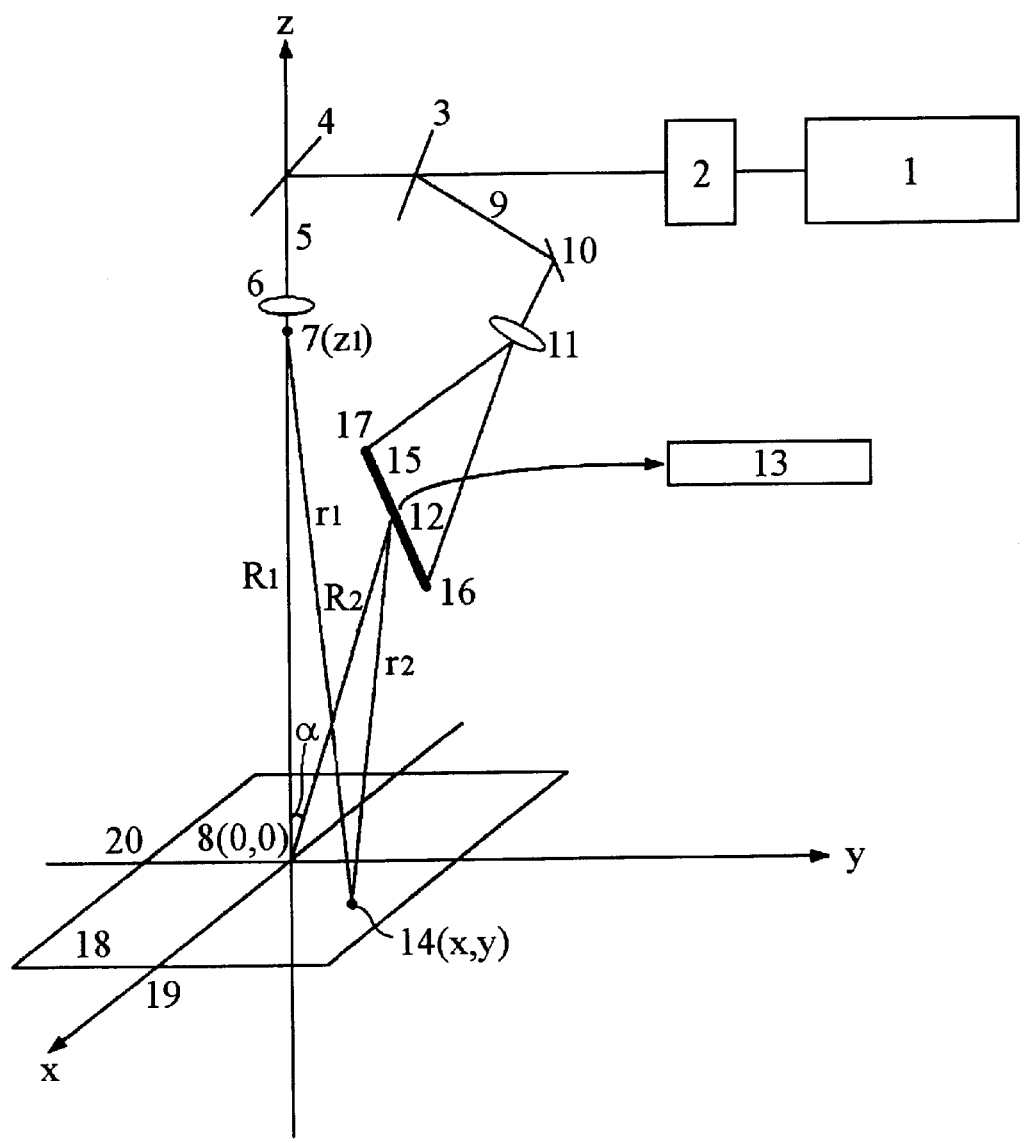
FIG. 1 is a schematic view showing an optical arrangement for producing a holographic screen according to the present invention.

The present invention will be described in detail by way of a preferred embodiment, with reference to accompanying drawings, in which like reference numerals are used to identify the same or similar parts.

As shown on FIG. 1, a light beam from laser 1 after shutter 2 is divided into two beams by the beam-splitter 3. One of the obtained beams, namely reference beam 5 is reflected from the mirror 4 and focused by the lens 6 to the point 7 on the z-axis with coordinate $z_1$ to form a diverging reference beam for the holographic screen recording on the photoplate 18. Usage of the diverging reference beam, unlike the previous art, makes it possible to use small size optics for the screen recording. The photoplate is disposed in the xy-plane and centered to the coordinate system origin 8. Second beam after beamsplitter 3, namely object beam 9, after reflection from mirror 10 is formed by the lens 11 so as to illuminate the diffuser 12 (the slit-shaped diffuser made of ground glass is shown as 13). Slit-shaped diffuser, stretched in the plane y-z, is used to provide later on forming the well-defined viewing zone, which is necessary for the stereoscopic imaging. 14 is an arbitrary point on the photoplate surface with coordinates x, y; 15—a point on the diffuser, 16 and 17 are correspondingly the nearest to the photoplate and the most distant from it points of the diffuser; 19 and 20 are correspondingly short side and long side of the photoplate; $r_1$ is the distance between a point 14 on the photoplate and a point 7—source of the diverging reference beam; $r_2$ is the distance between a point 14 on the photoplate and a point 15 on the diffuser, $R_2$ is the distance between the origin 8 and a point 15; $\alpha$ is the angle between the positive z-axis and a straight line connecting the origin 8 to the point 15.

Figure 2:
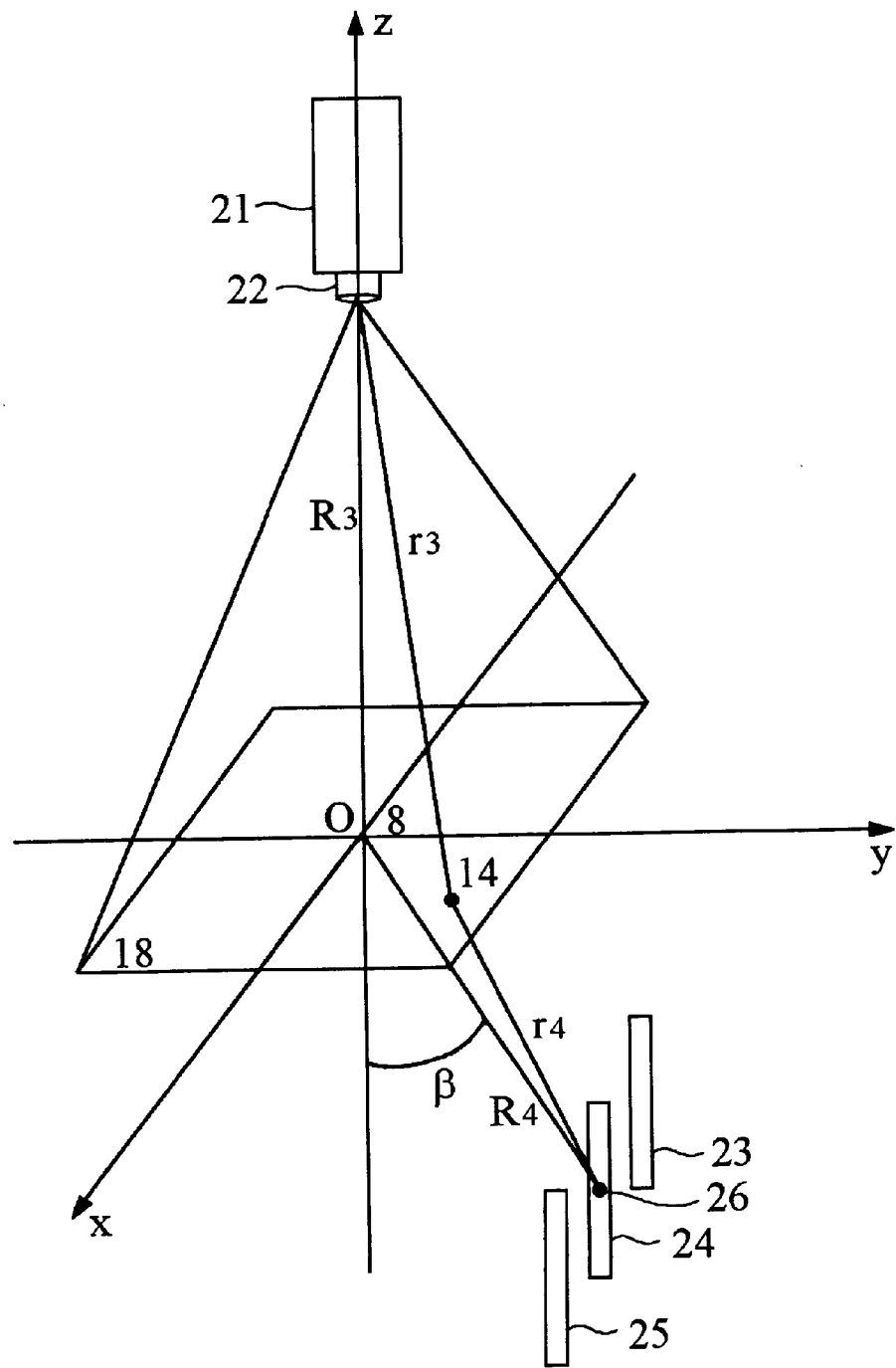
FIG. 2 is a schematic view illustrating the viewing zone forming, when a holographic screen, as provided according to the present invention is illuminated by the image projector.

On the FIG. 2 the principle of the viewing zone forming is illustrated when the holographic screen as produced in the setup of FIG. 1 is illuminated by the projector light. The projector 21 with the exit pupil 22 is used for projection on the screen 18 of the image to be viewed. Because of the holographic screen properties, the light diffracted on it is not scattered randomly, but is collected to produce in the space image of diffuser. As a result the bright image, projected on the screen, can be seen only if the viewer's eye is disposed in the diffuser image. As compared with the previously known art we are using the conjugate real image of the diffuser for forming the viewing zone. Reference numerals 23, 24 and 25 are conjugate images of the diffuser, as restored by different spectral components of the projector light. Because of the screen dispersion, the red image of the diffuser 23 will be diffracted on the bigger angle and will be disposed more close to the screen, than green image 24 or blue one 25. If the screen recording scheme is optimal, the diffuser images of all of the colors are overlapped in the vicinity of the point 26 and the fill color image on the screen can be seen by the eye disposed in the point 26. There are shown also in the FIG. 2: $r_3$—the distance between a point 14 on the photoplate (the same on the FIG. 1 and FIG. 2) and a point 22—source of the projection beam on the FIG. 2; $r_4$—the distance between a point 14 on the photoplate and a point 26—the point of the restored diffuser image on the FIG. 2; $R_4$—the distance between origin 8 (the same on the FIG. 1 and FIG. 2) and a point 26—the point of the restored diffuser image on the FIG. 2; $\beta$: the angle between the negative z-axis and a straight line connecting the origin 8 to the point 26.

The problem consists of the recording setup optimization so as to provide some domain in the space, where all color images of the diffuser will be overlapped. It is fulfilled in the present invention by means of appropriate selection of the diffuser length and its position in the recording setup.

Now we will derive the relations between the parameters of the recording setup and the image projection system, which have to be satisfied to produce the holographic screen with the specified characteristics.

Using the introduced designations, we can write for the energy distribution in the interference pattern formed on the photoplate surface in course of the recording:

$$I(x,y)=(Ae^{ikr_1}+Be^{ik_1r_2})(Ae^{-ikr_1}+Be^{-ik_2r_2})=A^2+B^2+ABe^{ik_1(r_1-r_2)}+ABe^{ik_1(r_2-r_1)} \quad (4)$$

where A and B are the amplitudes of the electric field in the reference and object waves, respectively, and $k_1$ is a wave number of the recording laser light.

In this case, the developed photoplate transmission (i.e., that of the holographic screen) can be presented approximately as follows:

$$T=T_0-T_1 I(x,y) \quad (5)$$

where $T_0$ is the transmission of the unexposed photoplate and $T_1 I(x,y)$ is the transmission change, caused by $I(x,y)$. When the holographic screen is illuminated by the projector light (as shown on the FIG. 2) with the wavelength X and wave number $k_2$, the electric field distribution $E_{out}$ of the light transmitted through the holographic screen for arbitrary point x,y on the screen surface can be expressed as follows:

$$E_{out}=Ce^{ik_2r_3} \cdot [\{T_0-T_1(A^2+B^2)\}+T_1ABe^{ik_1(r_1-r_2)}+T_1ABe^{ik_1(r_2-r_1)} \quad (6)$$

In Equation (6), the first, second and third terms represent a zero order diffracted light, a real image and a virtual image, respectively. If we want to obtain the real image at the point 26 (shown on FIG. 2), spaced apart by the distance $R_4$ from the screen center, the second term can be approximated as $D\exp(-ik_2r_4+\phi_0)$, where $\phi_0$ is the constant phase shift. Therefore, because the constant phase shift is not significant for the wave front focusing, the equation (1) can be met:

$$k_2 r_3 + k_1(r_1 - r_2) = -kr_4 + \text{const}$$

Equation (1) will be used now to derive the relationships between $R_1$, $R_2$, $R_3$ and $R_4$ together with the relations between $\alpha$ and $\beta$.

At first, $r_1$, $r_2$, $r_3$ and $r_4$ can be expressed using the triangular formula as follows:

$$r_1 = \sqrt{R_1^2 + x^2 + y^2}$$
$$r_2 = \sqrt{R_2^2 + x^2 + y^2 - 2R_2 x \sin\alpha} \qquad (7)$$
$$r_3 = \sqrt{R_3^2 + x^2 + y^2}$$
$$r_4 = \sqrt{R_4^2 + x^2 + y^2 - 2R_2 x \sin\beta}$$

Assuming that x and y are much smaller than $R_1$, $R_2$, $R_3$ and $R_4$, the above equations can be transformed into a Tailor series as follows:

$$r_1 \cong R_1\left(1 + \frac{x^2 + y^2}{2R_1^2} + \ldots\right) \qquad (8)$$

$$r_2 \cong R_2\left(1 + \frac{x^2 + y^2}{2R_2^2} - \frac{R_2 x \sin\alpha}{R_2^2} - \frac{x^2 \sin^2\alpha}{2R_2^2} + \ldots\right)$$

$$r_3 \cong R_3\left(1 + \frac{x^2 + y^2}{2R_3^2} + \ldots\right)$$

$$r_4 \cong R_4\left(1 + \frac{x^2 + y^2}{2R_4^2} - \frac{R_4 x \sin\beta}{R_4^2} - \frac{x^2 \sin^2\beta}{2R_4^2} + \ldots\right)$$

Substituting the above equations into Equation (1), Equation (1) can be arranged as follows:

$$k_2 R_3 + k_1(R_1 - R_2) + x(k_1 \sin\alpha) + \qquad (9)$$
$$\frac{x^2 + y^2}{2}\left\{\frac{k_2}{R_3} + k_1\left(\frac{1}{R_1} - \frac{1}{R_2}\right)\right\} + \frac{k_1 x^2 \sin^2\alpha}{2R_2} + \ldots =$$
$$-k_2 R_4 + \text{const} + k_2 x \sin\beta - \frac{x^2 + y^2}{2} \cdot \frac{k_2}{R_4} + \frac{k_2 x^2 \sin^2\beta}{2R_4}$$

Arranging both sides of Equation (9) with respect to x, y, $x^2$ and $y^2$, the following relationships can be established:

$$k_1 \sin\alpha = k_2 \sin\beta$$
$$\frac{k_2}{R_3} + \frac{k_1}{R_1} + \frac{k_2 \cos^2\beta}{R_4} = \frac{k_1 \cos^2\alpha}{R_2} \qquad (10)$$
$$\frac{k_2}{R_3} + k_1\left(\frac{1}{R_1} - \frac{1}{R_2}\right) = \frac{k_2}{R_4}$$

Solving Equations (10) with respect to $\alpha$ and $R_2$, the equations (2) and (3) can be obtained.

$$\alpha = \sin^{-1}\left(\frac{\lambda_1}{\lambda_2}\sin\beta\right) \qquad (2)$$

$$R_2 = \frac{R_1}{1 + \frac{2\lambda_1}{\lambda_2} \cdot \frac{R_1}{R_4}} \qquad (3)$$

If the coordinates of the point 15 ($y = R_2 \sin\alpha$, $z = R_2 \cos\alpha$) are substituted into equations (2,3) above, then it is seen, that a locus of the point 15 is a hyperbola. Therefore, the diffuser 12 must be curved along the hyperbolic surface. However, if $R_1$ is increased, the curvature of the diffuser 12 becomes negligibly small. Therefore, the long side of the diffuser 12 can be considered as a segment of the straight line. From Equations(2,3), the length and relative position of the diffuser can be found so as to provide a superposition at least at one point of the reconstructed images spatially shifted according to the wavelengths difference of the spectral components of the projector light. For illustrative purposes, values of $R_2$ and $\alpha$ were calculated for several values of $\lambda_2$ of the projected wave when the wavelength of the reference wave $\lambda_1$ is 0.647 μm (for a krypton laser), $R_1$=250 cm, $R_3$=$R_4$=150 cm and $\beta$=15°. The results are shown in Table 1 below.

TABLE 1

Relative Position of a Diffuser for Wavelengths of the Projected Wave

| $\lambda_2$(μm) | $R_2$(cm) | $\alpha$ |
|---|---|---|
| 0.4 | 39.11 | 24.75° |
| 0.5 | 47.05 | 19.57° |
| 0.6 | 54.41 | 16.2° |
| 0.7 | 61.26 | 13.84° |

The length of the diffuser 12 for the values of $\lambda_2$ listed in Table 1 was calculated to be 24 cm (it is distance between extreme points of diffuser, corresponding to 0.4 μm and 0.7 μm). From the comparison data from the Table 1 with FIG. 1, it is clear, that the upper end 17 and the lower end 16 of the diffuser 12 are responsible for presence in the viewing zone of red and blue light, respectively.

After exposure, the photoplate is developed and bleached. To protect the photoemulsion against possible damage, the emulsion side of the photoplate can be sealed by the photopolymer layer and glass plate.

Referring to the FIG. 2, if the holographic screen 18 has been produced with the diffuser 12 being positioned to satisfy the conditions in Table 1, and $R_1$, $R_2$, $R_3$, $R_4$, and $\beta$ are set as defined above, the point 26 becomes a point where the upper point of the reconstructed blue image (having a wavelength of 0.4 μm) and the lower point of the reconstructed red image (having a wavelength of 0.7 μm) are superimposed on each other. As the reconstructed images for all colors are superimposed at point 26, a color image can be seen when the holographic screen is observed through point 26. As the wavelengths of three primary colors required for the reconstruction of real color images occupies more narrow bandwidth, than the range from 0.4 to 0.7 μm, the region where the superposition of images occurs and thus a color image can be seen has some extent of area centered around the point 26.

Figure 3A:
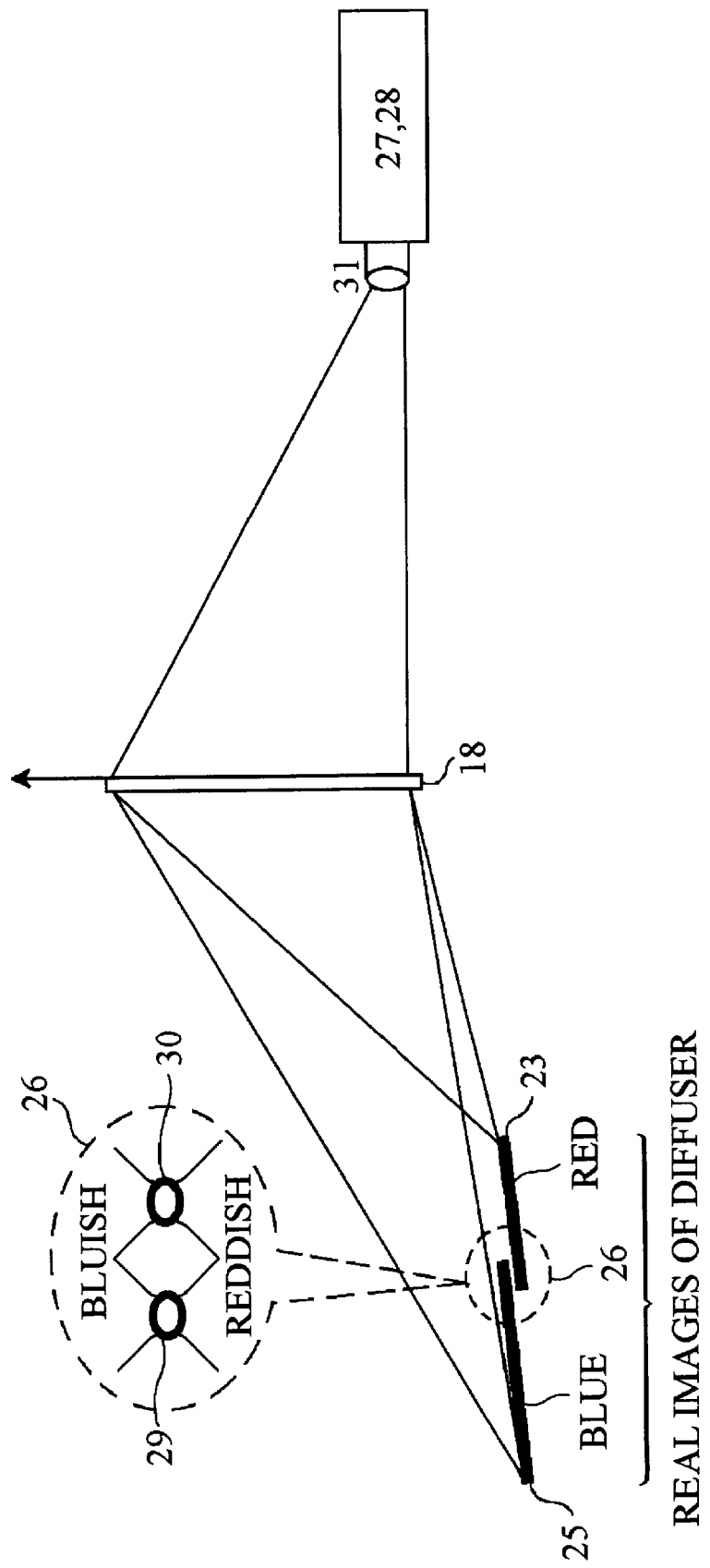
FIGS. 3a and 3b are a side view and a top view showing an optical arrangement for displaying stereoscopic image using a holographic screen produced according to the present invention.
Figure 3B:
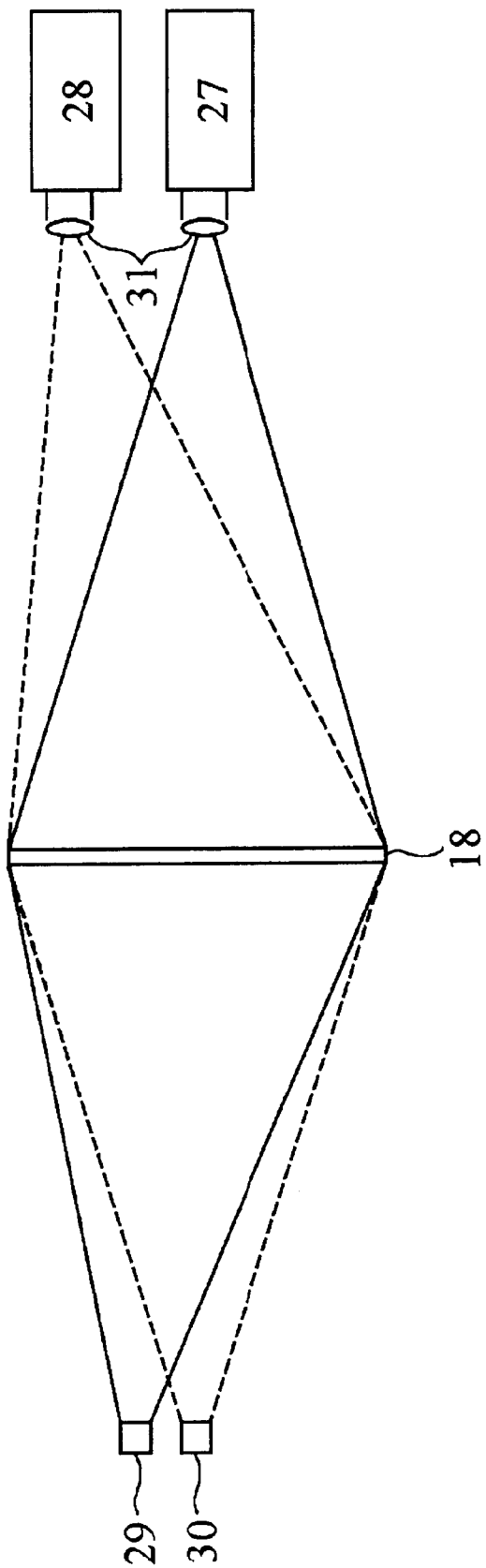

Referring to FIGS. 3a and 3b, an optical arrangement for displaying a stereoscopic image by using a holographic screen produced according to the present invention is shown. The images corresponding to the left and right eyes of a viewer, which is spaced apart by about 1.5 m from the holographic screen 18, are projected to be focused on the holographic screen 18 using two projectors 27, 28 located in symmetry with respect to the x-z plane. The projection lenses of the two projectors 27, 28 are separated by an eye-to-eye distance (6.5 cm). Then, the viewing zones 29, 30 corresponding to the respective projectors are formed opposite to the projectors 27, 28 and on the left side of the holographic screen 18 at the position spaced apart by about 1.5 m from the holographic screen 18. A spacing of about 6.5 cm exists between the viewing zones 29, 30. The width of the viewing zones 29 and 30 amounts approximately to the sum of the width of the aperture of the projection lens 31 and the width of the diffuser. Therefore, when the holographic screen is produced, the width of the diffuser should be small enough to provide that the viewing zones are not overlapping with each other. The viewing zones 29, 30, through which a color image on the screen can be seen, are formed at the center portions of the superposed color images of diffuser 23, 24, 25.

Figure 4:
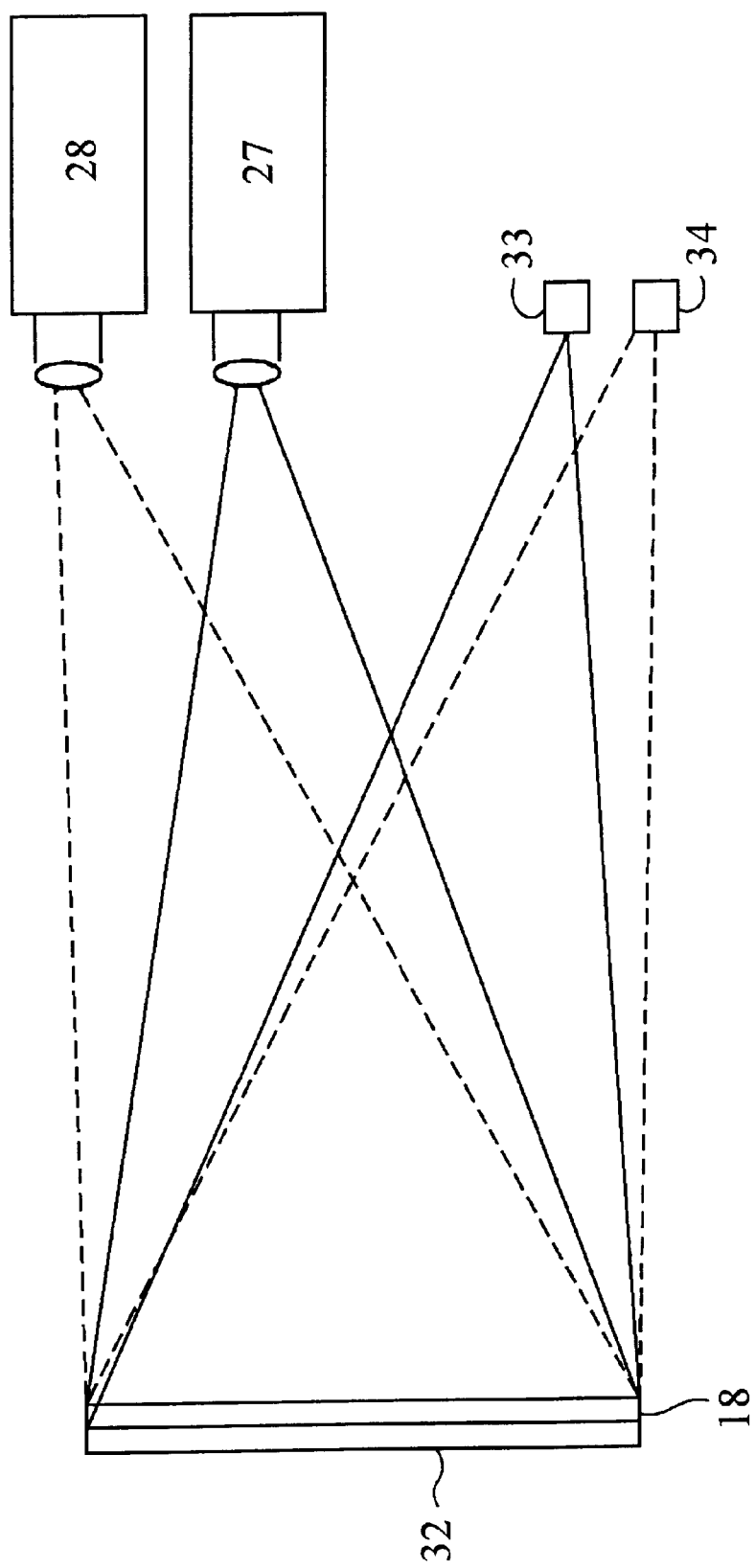
FIG. 4 is a schematic view showing an optical arrangement for displaying a stereoscopic image using a holographic screen produced according to the present invention as a reflection type holographic screen.

Referring to FIG. 4, an optical arrangement is shown for displaying a three dimensional image by using a holographic screen produced according to the present invention as a reflection type holographic screen. In order to use the holographic screen produced in FIG. 1 as a reflection type holographic screen, a reflective mirror 32 may be simply attached to the back side of the holographic screen 18. With this reflection-type holographic screen, the viewing zones 33, 34 are formed on the same side as the projectors 27, 28. In this scheme, the screen photoemulsion is protected by the mirror, sealed to the photoplate of the screen. Small angle rotation of the screen, together with the mirror will produce the shifting of the viewing zones, therefore the viewer's eye movement can be compensated by the appropriate eye-tracking system.

As can be understood from the above description with the present invention, the structure of an apparatus for producing a holographic screen and of an image reproduction apparatus using the holographic screen is mathematically analyzed to provide an optimized holographic screen for color image display.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A method of producing a holographic screen for displaying a stereoscopic or multiview color image, comprising the steps of:

placing a photoplate on an x-y plane of a three dimensional space, wherein the center of the photoplate being disposed in the origin of a three-dimensional space;

splitting the laser beam into two beams: reference beam and object beam, both beams being used to illuminate the photoplate surface;

shaping the reference beam as a spherical wave diverging from a point on a z-axis which is located a distance $R_1$ from the photoplate center;

shaping the object beam so as to illuminate the photoplate through an elongated narrow slit-shaped diffuser inclined to the photoplate surface;

recording an interference pattern, which is arising as a result of the superposition of the reference wave with an object wave from the diffuser on the photoplate;

whereby the stereoscopic or multiview three dimensional color images can be displayed on a recorded screen by projectors disposed at a distance $R_3$ from the screen, if a viewer's eyes are placed at viewing zones which are located behind the screen at a distance $R_4$, the viewing zones being composed of superposed diffuser's real images of the different colors;

wherein the coordinates of the diffuser point, which is responsible for the contribution of a light with a wavelength $\lambda_2$ in the viewing zone, are calculated from the following equations:

$$k_2 r_3 + k_1(r_1 - r_2) = -k_2 r_4 + \text{const} \tag{1}$$

$$\alpha = \sin^{-1}\left[\frac{k_2}{k_1}\sin\beta\right] = \sin^{-1}\left[\frac{\lambda_1}{\lambda_2}\sin\beta\right] \tag{2}$$

$$R_2 = \frac{R_1}{1 + \frac{2\lambda_1 R_1}{\lambda_2 R_4}} \tag{3}$$

where $r_1$ is the distance between an arbitrary point (x,y) on the photoplate and a position of the source of the reference beam; $r_2$ and $R_2$ are the distances between a point (x,y) on the photoplate and a point on the diffuser and between the coordinate origin and the same diffuser point; $\alpha$ is the angle between $R_2$ straight line and the positive z-axis; $r_3$ is the distance between a point (x,y) on the photoplate and a point source of the projection beam; $r_4$ is the distance between a point (x,y) on the photoplate and a viewing zone; $R_4$ is the distance between an origin and a viewing zone; $\beta$ is the angle between $R_4$ straight line and the negative z-axis; $\lambda_1$ and $\lambda_2$ represent wavelengths of the recording and projecting waves, respectively; $k_1$ and $k_2$ are wave numbers of the recording and projecting waves, respectively;

wherein the diffuser's length and position are calculated using equations (2) and (3) for covering an entire spectral range of a projected image.

2. The method of producing a holographic screen according to claim 1, wherein the diverging reference beam with prescribed position of its point source is formed by small size optical element (lens or mirror) or a combination of a small size optical elements.

3. The method of producing a holographic screen according to claim 1, wherein the diffuser is a long narrow and straight slit-shaped ground glass, the necessary length of diffuser and its position for covering the entire spectral range of the projected image being determined by equations (2) and (3).

4. The method of producing a holographic screen according to claim 1, wherein a reflection mirror is attached to the holographic screen to use the screen as a reflection type one, and said reflection type holographic screen can change the viewing zone position continuously as the screen rotates together with mirror.

* * * * *